United States Patent
Duda

(10) Patent No.: US 9,307,449 B2
(45) Date of Patent: Apr. 5, 2016

(54) TRAFFIC LOAD MANAGEMENT METHOD, NETWORK AND DEVICE

(75) Inventor: Adrian Duda, Calgary (CA)

(73) Assignee: FRANCE TELECOM, Paris (FR)

( * ) Notice: Subject to any disclaimer, the term of this patent is extended or adjusted under 35 U.S.C. 154(b) by 317 days.

(21) Appl. No.: 13/702,001

(22) PCT Filed: Jun. 9, 2011

(86) PCT No.: PCT/EP2011/059639
§ 371 (c)(1),
(2), (4) Date: Dec. 4, 2012

(87) PCT Pub. No.: WO2011/154512
PCT Pub. Date: Dec. 15, 2011

(65) Prior Publication Data
US 2013/0079011 A1 Mar. 28, 2013

(30) Foreign Application Priority Data
Jun. 10, 2010 (EP) .................................... 10305619

(51) Int. Cl.
*H04W 28/10* (2009.01)
*H04L 12/24* (2006.01)
(Continued)

(52) U.S. Cl.
CPC ........... *H04W 28/10* (2013.01); *H04L 12/2439* (2013.01); *H04L 47/122* (2013.01); *H04W 28/08* (2013.01); *H04L 2012/568* (2013.01); *H04W 92/14* (2013.01); *H04W 92/24* (2013.01)

(58) Field of Classification Search
CPC .......................... H04L 47/122; H04L 12/2439
USPC .............................................. 455/436, 422.1
See application file for complete search history.

(56) References Cited

U.S. PATENT DOCUMENTS

| 7,024,203 B1 * | 4/2006 | Naghian | ............... H04W 28/18 455/436 |
| 2003/0126200 A1 * | 7/2003 | Wolff | ........................ G06F 9/52 709/203 |

(Continued)

FOREIGN PATENT DOCUMENTS

| EP | 1737256 A1 | 12/2006 |
| EP | 1895801 A1 | 3/2008 |

OTHER PUBLICATIONS

International Search Report dated Aug. 31, 2011 for corresponding International Application No. PCT/EP2011/059639, filed on Jun. 9, 2011.

(Continued)

*Primary Examiner* — Qun Shen
(74) *Attorney, Agent, or Firm* — David D. Brush; Westman, Champlin & Koehler, P.A.

(57) ABSTRACT

A radiocommunication network includes a core network including primary and secondary nodes and a radio access network including radio controllers. Each primary node connects at least one secondary node, and each secondary node connects at least one radio controller via respective links. In relation to a given primary node, at least one entity in the radiocommunication network calculates respective target load reduction values for the links connecting the given primary node and secondary nodes, depending on an excess value between a current load of the given primary node and a primary node load threshold, and calculates respective target load reduction values for the links connecting said secondary nodes connected to the given primary node and radio controllers, depending on calculated target load reduction values. Actions are taken for changing traffic distribution by taking account of calculated target load reduction values.

14 Claims, 3 Drawing Sheets

(51) Int. Cl.
*H04L 12/803* (2013.01)
*H04W 28/08* (2009.01)
*H04L 12/70* (2013.01)
*H04W 92/14* (2009.01)
*H04W 92/24* (2009.01)

(56) References Cited

U.S. PATENT DOCUMENTS

| | | | |
|---|---|---|---|
| 2005/0122942 A1 | 6/2005 | Rhee et al. | |
| 2008/0132239 A1* | 6/2008 | Khetawat | H04W 36/12 455/438 |
| 2008/0188231 A1 | 8/2008 | Zhu et al. | |
| 2008/0311924 A1* | 12/2008 | Lucidarme | 455/452.1 |
| 2009/0046665 A1* | 2/2009 | Robson et al. | 370/332 |
| 2009/0047931 A1* | 2/2009 | Nanda et al. | 455/411 |
| 2009/0147678 A1* | 6/2009 | Xhafa | H04L 1/0002 370/232 |
| 2010/0034090 A1* | 2/2010 | Bader | H04L 47/10 370/236 |
| 2010/0144363 A1* | 6/2010 | De Rosa et al. | 455/452.1 |
| 2010/0185766 A1* | 7/2010 | Sano et al. | 709/226 |

OTHER PUBLICATIONS

English Translation of the Written Opinion of the International Searching Authority dated Aug. 31, 2011 for corresponding International Application No. PCT/EP2011/059639, filed Jun. 9, 2011.
Velayos, H. et al, "Load balancing in overlapping wireless LAN cells," Communications, 2004 IEEE International Conference on , vol. 7, no., pp. 3833-3836 vol. 7, Jun. 20-24, 2004.

* cited by examiner

TRAFFIC LOAD MANAGEMENT METHOD, NETWORK AND DEVICE

CROSS-REFERENCE TO RELATED APPLICATIONS

This application is a Section 371 National Stage Application of International Application No. PCT/EP2011/059639, filed Jun. 9, 2011, which is incorporated by reference in its entirety and published as WO 2011/154512 on Dec. 15, 2011, in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to traffic load management in a radiocommunication network.

BACKGROUND OF THE DISCLOSURE

Traffic load management is a constant concern for radiocommunication network operators. This is because congested links or devices in a radiocommunication network may lead to suboptimal functioning with possible detrimental consequences for end-users, such as radio access failures, slowness of data transfers, decrease in quality of service, etc.

In the recent years, the dramatic increase in data traffic in radiocommunication networks (GPRS, 3G) has made this concern even more critical. This dramatic increase is due in particular to the availability of mobile broadband kits, dual-mode phones, as well as a change in the users' behaviour by using more high-bandwidth consuming data applications.

There are some identified solutions that are able to alleviate partially this pressure on the spectrum, such as:
Roll out of an additional HSPA (High Speed Packet Access) carrier,
Device evolution (with evolved receivers technologies),
Deployment of six-sectors sites,
GSM band refarming,
Purchase of a new carrier, e.g. in the 2.1G band, etc.

It should be noted that these solutions yield additional costs and require time for deployment which might be incompatible with most radiocommunication network operators' requirements and constraints. Furthermore, the above solutions are macro-planning oriented and therefore cannot handle event-based or location-based demands on the bandwidth.

This generates the need to come up with solutions to improve the capacity of the radiocommunication networks by better managing traffic load.

Some known techniques tried to achieve this goal but focused on a limited part of the network, for example the core network only or the radio access network only.

SUMMARY

An exemplary embodiment of the invention proposes a method of managing traffic load in a first radiocommunication network comprising a core network including primary and secondary nodes and a radio access network including radio controllers, each primary node connecting at least one secondary node and each secondary node connecting at least one radio controller via respective links. The method comprises the following steps in relation to a given primary node:
calculating respective target core network load reduction values for the links connecting the given primary node and secondary nodes, depending on an excess value between a current load of the given primary node and a first primary node load threshold;
calculating respective target radio access network load reduction values for the links connecting said secondary nodes connected to the given primary node and radio controllers, depending on calculated target core network load reduction values; and
taking actions for changing traffic distribution by taking account of at least some of the calculated target radio access network load reduction values.

The load on some components of the network is thus levelled out by employing a cascading mechanism emerging from the core network components back to the radio network components in which the traffic can be redistributed. An embodiment of the invention thus takes an overall view of the radiocommunication network, including both the core network and the radio access network parts.

According to other advantageous aspects of an embodiment of the invention which may be combined in any possible way:
the target core network load reduction values and/or the target radio access network load reduction values are calculated on a fair basis, by taking account of current load values of the links connecting the given primary node and secondary nodes and/or the links connecting said secondary nodes connected to the given primary node and radio controllers. This avoids giving preference to some links and handicap to others;
the first radiocommunication network further comprises a femto subnetwork including a femto node connected to the given primary node, and the calculated respective target core network load reduction values for the links connecting the given primary node and secondary nodes further depend on a difference between the current load of the given primary node and a current load of the link between the femto node and the given primary node. By doing so, no reduction of load is sought on the femto subnetwork, and thus resources on the radio access network of the first radiocommunication network can be kept free;
the target radio access network load reduction value $D_{j,N}$ for the link connecting the secondary node N connected to the given primary node i and the radio controller j is calculated as:

$$D_{j,N} = \frac{\text{Load\_Radio}_{j,N} * \text{Load\_Core}_{N,i} * (\text{Load\_GGSN}_i - \text{th\_ok}_j)}{\text{Load\_SGSN}_N * (\text{Load\_GGSN}_i - \text{Load\_femto}_i)},$$

where N, i and j represent integers, $\text{Load\_Radio}_{j,N}$, $\text{Load\_Core}_{N,i}$, $\text{L\_GGSN}_i$, $\text{Load\_SGSN}_N$ and $\text{Load\_femto}_i$, represent the load respectively of the link between the radio controller j and the secondary node N, the link between the secondary node N and the given primary node i, the given primary node i, the secondary node N and the link between the femto node, if any, and the given primary node i, and $\text{th\_ok}_j$ represents said primary node load threshold for the given primary node i. This calculation allows an interesting and efficient target load reduction;

the load of any of said nodes, radio controllers and links is a function at least one of a corresponding: used bandwidth, number of running sessions, processing effort, type of service and quality of service. The most appropriate definition of the load can thus be adopted depending on the needs. This allows some flexibility in the traffic redistribution by the radiocommunication network operator;

the target core network load reduction values and target radio access network load reduction values are calculated on detection that a current load of the given primary node is above a second primary node load threshold. In this way, the calculations can be performed only when this is useful and relevant;

a new current load of the given primary node is measured after said actions for changing traffic distribution have been taken, and if the measured current load of the given primary node is still in excess compared to the first primary node load threshold, the second primary node load threshold is decreased. This training process allows an interesting adjustment of the second primary node load threshold, in such a way that the calculations are performed at even more useful and relevant times;

the actions taken for changing traffic distribution include handing over some traffic within the first radiocommunication network so as to reach at least some of the target radio access network load reduction values for at least some respective links connecting said secondary nodes connected to the given primary node and radio controllers. In this way, load reduction may be obtained without the need of extra networks;

the first radiocommunication network further comprises a femto subnetwork including a femto node connected to the given primary node, and there is a second radiocommunication network unconnected to the core network of the first radiocommunication network, the actions taken for changing traffic distribution including handing some traffic over the femto subnetwork and/or the second radiocommunication network so as to reach at least some of the target radio access network load reduction values for at least some respective links connecting said secondary nodes connected to the given primary node and radio controllers. In this way, more load reduction can be achieved by discharging traffic to extra networks;

the traffic handed over the femto subnetwork and/or the second radiocommunication network is selected by taking account of at least one of the following criteria relating to said traffic: quality of service, session continuity capability, and need to go through the core network of the first radiocommunication network. This allows having benefits in addition to load reduction, such as quality of service improvement and/or transparency for the end-users;

the traffic going through a radio controller, a secondary node and a primary node of the first radiocommunication network is handed in priority over the femto subnetwork or the second radiocommunication network depending on a current load of said radio controller and/or on a current load of said secondary node and/or on a current load of said primary node. This flexibility takes benefit from the specificities of the extra networks (shared or separate core network), which may further improve the load reduction;

user equipment involved in the traffic handed over the femto subnetwork or the second radiocommunication network is instructed of whether said traffic is to be handed in priority over the femto subnetwork or the second radiocommunication network. This is a simple and transparent way of performing appropriate handover;

the instruction is transmitted by the radio controller through which said traffic goes, in a HANDOVER_FROM_UTRAN_COMMAND or HANDOVER_COMMAND[DCCH] message. The use of such existing and standardized message avoids a further complex adaptation of the equipment involved, such as RNCs and user equipment.

An embodiment of the present invention also proposes a radiocommunication network comprising a core network including primary and secondary nodes and a radio access network including radio controllers, each primary node connecting at least one secondary node and each secondary node connecting at least one radio controller via respective links. The radiocommunication network is arranged for carrying out the above mentioned method and comprises in relation to a given primary node:

a first calculation entity for calculating respective target core network load reduction values for the links connecting the given primary node and secondary nodes, depending on an excess value between a current load of the given primary node and a first primary node load threshold;

a second calculation entity for calculating respective target radio access network load reduction values for the links connecting said secondary nodes connected to the given primary node and radio controllers, depending on calculated target core network load reduction values; and an entity for taking actions for changing traffic distribution by taking account of at least some of the calculated target radio access network load reduction values.

An embodiment of the invention also proposes a radio controller for use in a radiocommunication network, the radio controller being connectable to a secondary node which in turn connects to a primary node, the primary node and the secondary node being part of a core network of the radiocommunication network. The radio controller comprises:

a unit for obtaining a target radio access network load reduction value for the link connecting the radio controller and the secondary node, said target radio access network load reduction value depending on an excess value between a current load of the primary node and a primary node load threshold; and a unit for reducing traffic on the link connecting the radio controller and the secondary node by taking account of said target radio access network load reduction value.

The preferred features of the above aspects which are indicated by the dependent claims may be combined as appropriate, and may be combined with any of the above aspects of embodiments of the invention, as would be apparent to a person skilled in the art.

DETAILED DESCRIPTION OF ILLUSTRATIVE EMBODIMENTS

An embodiment of the invention may take place in any type of radiocommunication network, provided that it comprises a core network including primary and secondary nodes and a radio access network including radio controllers.

Figure 1:
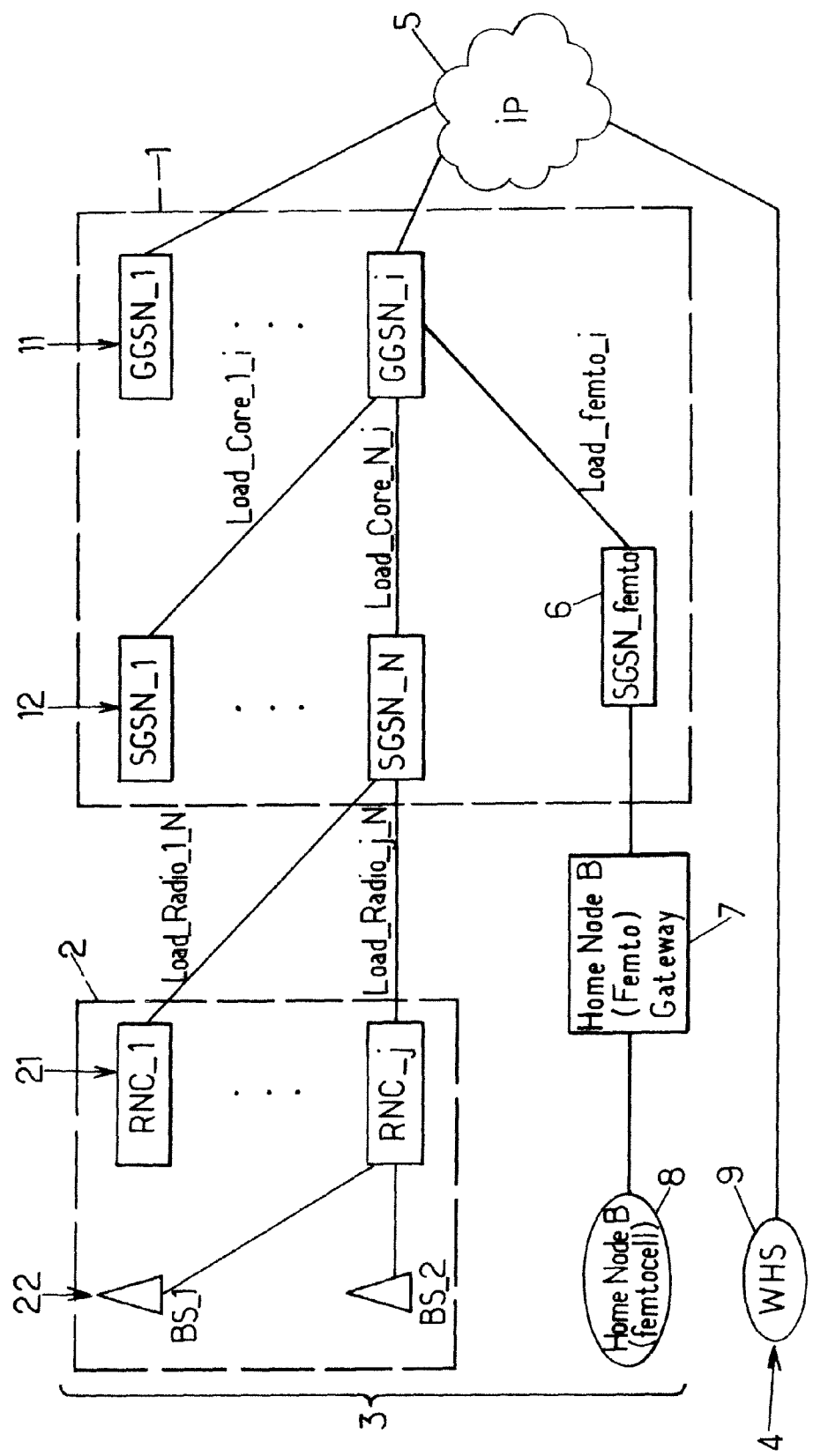
FIG. 1 shows a non-limiting system architecture in which an embodiment of the invention may take place.

The radiocommunication network shown in FIG. 1 is a 3G or UMTS (Universal Mobile Telecommunications System) network. It comprises a core network CN 1 including primary nodes 11 known as GGSNs (Gateway GPRS Support Nodes, where GPRS stands for General Packet Radio Service) and secondary nodes 12 known as SGSNs (Serving GPRS Support Nodes, where GPRS stands for General Packet Radio Service), as well as a radio access network RAN 2 including radio controllers 21 known as RNCs (Radio Network Controllers).

As well known in the art, a GGSN may be responsible for the interworking between the radiocommunication network and external packet switched networks, like an IP (Internet Protocol) network 5 such as the Internet and/or an X.25 network.

An SGSN may be responsible for the delivery of data packets from and to the mobile stations within its geographical service area. Its tasks include packet routing and transfer, mobility management (attach/detach and location management), logical link management, and authentication and charging functions. The location register of the SGSN stores location information (e.g., current cell, current Visitor Location Register VLR) and user profiles (e.g. International Mobile Subscriber Identity IMSI, address(es) used in the packet data network) of all users registered with this SGSN.

An RNC may be responsible for controlling the base stations or NodeBs that are connected to it. The RNC carries out radio resource management, some of the mobility management functions and is the point where encryption is done before user data is sent to and from the mobile. The RNC connects to the Circuit Switched Core Network through Media Gateway (MGW) and to an SGSN (Serving GPRS Support Node) in the Packet Switched Core Network.

In this architecture, each GGSN 11 connects at least one SGSN 12. For example, GGSN_i connects SGSN_1 to SGSN_N via respective links using an appropriate interface, where i and N represent integers of any possible value.

Each SGSN 12 connects at least one RNC 21 via respective links using an appropriate interface. For example, SGSN_N connects RNC_1 to RNC_j, where j represents an integer of any possible value.

In addition, each RNC 21 connects at least one base station BS or NodeB 21 via links using an appropriate radio interface. For example, RNC_j connects BS_1 and BS_2 in the example shown in FIG. 1.

Figure 2:
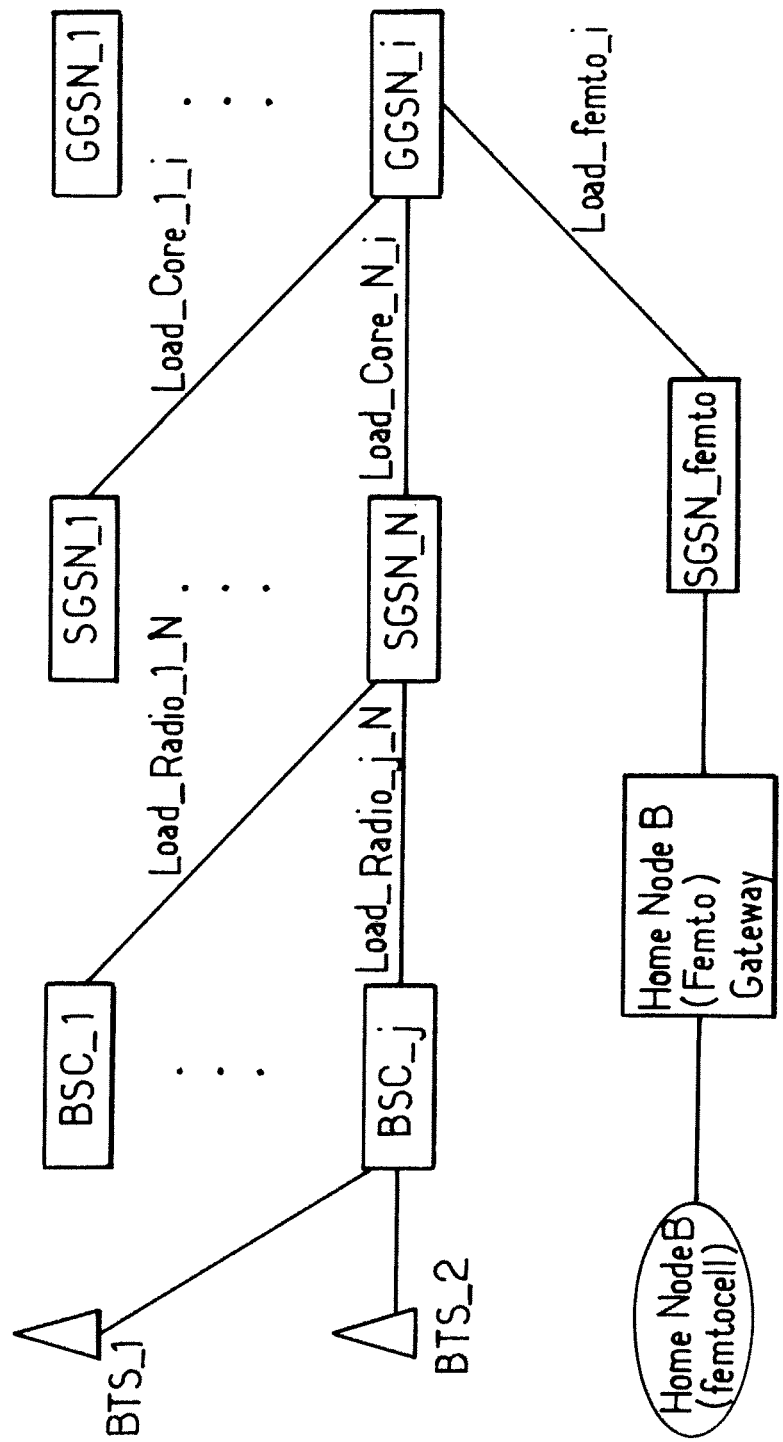
FIG. 2 shows another non-limiting system architecture in which an embodiment of the invention may take place.

Note that the example of FIG. 1 is non-limiting. Other equipment with different and/or additional functions may be used instead within the framework of an embodiment of the invention. For illustration purpose, FIG. 2 shows another non-limiting example of a radiocommunication network of the GSM (Global System for Mobile Communications)/GPRS (General Packet Radio Service) type. A 4G or LTE (Long Term Evolution) radiocommunication network, or even any other radiocommunication network may be used as an alternative.

Back to the example shown in FIG. 1, the radiocommunication network 3 may optionally further comprise a femto subnetwork as known in the art. Such femto subnetwork can be seen as having a radio access part independent of the RAN 2 of the radiocommunication network 3, but a core part included in the CN 1 of the radiocommunication network 3. To do so, the femto subnetwork includes a HomeNodeB or femtocell 8 which ensures radio connectivity with user equipment, a HomeNodeB gateway or femto gateway 7 and a SGSN_femto 6 which plays the role of a conventional SGSN and connects an GGSN (here GGSN_i) of the radiocommunication network 3. User equipment having a radio link with the femtocell 8 may thus communicate through the CN 1 but without using the RAN 2.

Additionally or alternatively, the system of FIG. 1 may also comprise another radiocommunication network 4 independent of the radiocommunication network 3. Such radiocommunication network 4 may comprise radio equipment ensuring a radio connectivity, like a WiFi hotspot WHS 9 for example. Other types or technologies (Bluetooth, WiMax, cellular network technology of another operator, etc.) may be used in addition or in remplacement. Like the radiocommunication network 3, the radiocommunication network 4 may give access to an external network, such the IP network 5 or other.

In the following, traffic load management will be more specifically considered within the service area of GGSN_i of FIG. 1 for clarity purpose. It will be noted that the same description may apply in relation to any other GGSN (or primary node) of the radiocommunication network.

Each device (SGSN, RNC, BS) and each link (GGSN-SGSN, SGSN-RNC, RNC-BS) within the service area of GGSN_i presents a certain load. This load can be expressed in any suitable way.

As non-limiting examples, the load may correspond to a bandwidth used on a given link device, a number of sessions running on a given link or device, a processing effort on a given link or device, a type of service (e.g. conversational, real-time, background, etc.) for a service passing through a given link or device, a quality of service (e.g. delay, jitter, packet loss rate, etc.) for a service passing through a given link or device, or any other relevant parameter.

Any combination of two or more of those parameters may also be used as a definition of the load. To this end, a multi-criteria utility function may be used to define the load. Such utility function F may be expressed for example as a sum of weighted contributions of at least some of the above parameters. For instance, with respect to a given link or device, one could define F as:

$$F = \text{weight\_total\_bandwidth} * f1(\text{bandwidth}) + \text{weight\_number\_of\_sessions} * f2(\text{number\_of\_sessions}) + \text{weight\_types\_of\_service} * f3(\text{type\_of\_service}),$$

where weight_total_bandwidth, weight_number_of_sessions, weight_types_of_service correspond to real numbers and f1, f2, f3 represent any suitable function. In this way, priorities are granted to the different parameters. Of course, many other examples may be envisaged as this will appear to one skilled in the art.

Note that the way in which the load function is expressed may be defined in a predetermined manner or dynamically. As an example, in some cases the radiocommunication network operator may be more interested in the total bandwidth consumed in the network, while in other cases some other parameters can be considered such as the type of services or the number of sessions, or individual quality of service parameters (such as delay, jitter, packet loss rate).

The choice of the utility function may depend on a policy of the radiocommunication network operator.

It may be the same for all links and/or devices, or conversely it may differ depending on the links and/or devices.

For simplicity, the term "load" will be used in the following, irrespective of whether it relates to such or such parameter or any combination thereof.

The notations $Load\_GGSN_{i1}$ and $Load\_SGSN_{i2}$ are used in the following to designate the load of $GGSN\_i1$ and $SGSN\_i2$ respectively, where $i1$ is an integer between 1 and $i$ and $i2$ is an integer between 1 and N.

Also, as shown in FIG. 1, the notations $Load\_Core_{i2,i1}$, $Load\_femto_i$, and $Load\_Radio_{i3,i2}$ are used in the following to designate the load of the link between $GGSN\_i1$ and $SGSN\_i2$, the link between $GGSN\_i$ and $SGSN\_femto$ and the link between $SGSN\_i2$ and $RNC\_i3$ respectively, where $i3$ is an integer between 1 and $j$.

It is assumed that $GGSN\_i$ works smoothly and properly under a load threshold, noted $th\_ok\_i$. This threshold may be defined by the radiocommunication network operator. It may alternatively be set based on experience, for instance after analyzing appropriate indicators. It may be defined in a fixed or dynamic manner. Beyond this threshold, detrimental phenomena, such as congestion, packet loss, etc., may occur in a too frequent way.

If the current load of $GGSN\_i$, i.e. $Load\_GGSN_i$, is in excess compared to $th\_ok\_i$, it would be favourable to reduce it to $th\_ok\_i$ so that $GGSN\_i$ can work smoothly. To do so, the core network links between $GGSN\_i$ and its connected SGSNs, i.e. $SGSN\_1$ to $SGSN\_N$, may be considered and respective target load reduction values may be calculated for all or part of those links. Those target load reduction values depend on the excess value between the current load of $GGSN\_i$ and the load threshold $th\_ok\_i$, that is on $Load\_GGSN_{i1}-th\_ok\_i$. A non-limiting example of calculation of such target load reduction values will now be described in more detail.

Suppose that $GGSN\_i$ is communicating with $SGSN\_1$ to $SGSN\_N$ and $SGSN\_femto$. The load on each link between $SGSN\_1$ to $SGSN\_N$ and $GGSN\_i$ should be reduced with a certain amount, so that, after the reductions, the sum of the loads of all the links would be equal to the load level for which the GGSN is working optimally, that is $th\_ok\_i$.

Let $x\_N\_i$ be the amount of traffic load that would have to be deducted from the current load of the link between $SGSN\_N$ and $GGSN\_i$.

The load after this traffic reduction for the link between $SGSN\_N$ and $GGSN\_i$ will adjust as follows:

Initial value: $Load\_Core_{N,i}$

New value: $Load\_Core_{N,i} - x\_N\_i$.

It might be preferred for a user to be connected to a femtocell, rather than a "normal" macrocell base station. From the radiocommunication network operator's point of view, this may indeed improve the network capacity by freeing resources on the RAN 2 while keeping traffic on going through the CN 1. So it may be decided not to adjust the load on $SGSN\_femto$. Other decisions may be taken instead as will be understood by one skilled in the art.

So assuming that the load on $SGSN\_femto$ must be kept unchanged, the sum of the new load values for the links between the $GGSN\_i$ and its connected SGSNs should equal $th\_ok\_i$. This can be expressed as follows:

$$(Load\_Core_{1,i}-x\_1\_i)+\ldots+(Load\_Core_{N,i}-x\_N\_i)+Load\_femto_i=th\_ok\_i,$$

which is equivalent to:

$$(Load\_Core_{i}+\ldots+Load\_Core_{N,i})+Load\_femto_i-th\_ok\_i=x\_1\_i+\ldots+x\_N\_i,$$

which is equivalent to:

$$Load\_GGSN_i-th\_ok\_i=x\_1\_i+\ldots+x\_N\_i \qquad (1).$$

The expression (1) confirms that the target core network load reduction values $x\_1\_i, \ldots, x\_N\_i$ depend on the excess value $Load\_GGSN_i-th\_ok\_i$.

Many different values $x\_1\_i, \ldots, x\_N\_i$ could be obtained according to the expression (1) above. In an advantageous embodiment, the traffic load is reduced on the links between $SGSN\_1$ to $SGSN\_N$ and $GGSN\_i$ according to a fair process, which means by taking account of the current load values of those links. Thus, if a SGSN-GGSN link is more highly loaded than another SGSN-GGSN link, then more traffic will be deducted from the higher loaded link than from the less loaded one. In a non-limiting example, this can be expressed as follows:

$$x\_1\_i/Load\_Core_{1,i}=\ldots=x\_N\_i/Load\_Core_{N,i} \qquad (2).$$

Let us take into consideration the following mathematical propriety. If there are some numbers a1, b1, a2, b2, ..., an, bn, so that $a1/b1=a2/b2=\ldots=an/bn$, then the following relation is also always true: $a1/b1=a2/b2=\ldots an/bn=(a1+a2+\ldots+an)/(b1+b2+\ldots+bn)$, When applying this mathematical propriety to expression (2), it comes:

$$X\_1\_i/Load\_Core_{1,i}=\ldots=x\_N\_i/Load\_Core_{Nj}= \qquad (3)$$
$$(x\_1\_i+\ldots+x\_N\_i)/(Load\_Core_{1,i}+\ldots+Load\_Core_{N,i}).$$

In the right hand member of the expression (3), by replacing $x\_1\_i+\ldots+x\_N\_i$ with $Load\_GGSN_i-th\_ok\_i$ according to the expression (1), it comes:

$$x\_1\_i/Load\_Core_{1,i}=\ldots=x\_N\_i/Load\_Core_{N,i}= \qquad (5)$$
$$(Load\_GGSN_i-th\_ok\_i)/(Load\_GGSN_i-Load\_femto_i).$$

And since $Load\_Core_{1,i}+\ldots+Load\_Core_{N,i}+Load\_femto_i=Load\_GGSN_i$ (the current load in $GGSN\_i$), then:

$$x\_1\_i/Load\_Core_{1,i}=\ldots=x\_N\_i/Load\_Core_{Nj}= \qquad (4)$$
$$(Load\_GGSN_i-th\_ok\_i)/(Load\_Core_{1,i}+\ldots+Load\_Core_{N,i}).$$

From the expression (5), each target core network load reduction value can read:

$$x\_1\_i=Load\_Core_{1,i}* \qquad (6)$$
$$(Load\_GGSN_i-th\_ok\_i)/(Load\_GGSN_i-Load\_femto_i)$$

$$x\_2\_i=Load\_Core_{2,i}*(Load\_GGSN_i-th\_ok\_i)/$$
$$(Load\_GGSN_i-Load\_femto_i)$$

...

$$x\_N\_i=Load\_Core_{N,i}*$$
$$(Load\_GGSN_i-th\_ok\_i)/(Load\_GGSN_i-Load\_femto_i).$$

One skilled in the art will understand that those values are only non-limiting examples obtained from a fair basis calculation, but other values could be obtained for all or part of $x\_1\_i, \ldots, x\_N\_i$.

Of course, if the considered radiocommunication network does not comprise a femto subnetwork, then Load_femto, should be cancelled, and $x\_1\_i, \ldots, x\_N\_i$ could read for example:

$$x\_1\_i = \text{Load\_Core}_{1,i} * (\text{Load\_GGSN}_i - \text{th\_ok\_i})/\text{Load\_GGSN}_i \quad (7)$$

$$x\_2\_i = \text{Load\_Core}_{2,i} * (\text{Load\_GGSN}_i - \text{th\_ok\_i})/\text{Load\_GGSN}_i$$

$$\ldots$$

$$x\_N\_i = \text{Load\_Core}_{N,i} * (\text{Load\_GGSN}_i - \text{th\_ok\_i})/\text{Load\_GGSN}_i.$$

So, the values by which the load should be reduced on the links between GGSN_i and SGSN_1 to SGSN_N are given by the values $x\_1\_i, x\_2\_i, \ldots, x\_N\_i$ according to the system (6) (or (7) if there is no femto subnetwork).

All the values in the right hand side of each equality in the system (6) (or (7)) above are known, so the values of $x\_1\_i, x\_2\_i, \ldots, x\_N\_i$ can be easily calculated. In the present example, they are proportional to the excess value Load_GGSN_i–th_ok_i. The proportionality coefficient, $\text{Load\_Core}_{1,i}/\text{Load\_GGSN}_i, \ldots, \text{Load\_Core}_{N,i}/\text{Load\_GGSN}_i$, relates to a contribution of SGSN_1, SGSN_N in the current load of GGSN_i. As already mentioned, other values could be calculated for $x\_1\_i, x\_2\_i, \ldots, x\_N\_i$, while still depending on the excess value Load_GGSN_i–th_ok_i.

But in order to reduce the load on the SGSN-GGSN links, it is not sufficient to have target core network load reduction values. Target radio access network load reduction values must also be calculated with respect to RNC-SGSN links.

For simplicity, let us more specifically consider SGSN_N which communicates with RNC_1, RNC_j. The total traffic offload of the links between RNC_1 to RNC_j and SGSN_N must be reduced by x_N_i.

It is thus calculated respective target radio access network load reduction values for all or part of the links between RNC_1 to RNC_j and SGSN_N, so that the load between SGSN_N and GGSN_i is reduced by x_N_i as previously obtained. Similar operations may be done with respect to all or part of the other SGSNs connected to GGSN_i.

This calculation may be performed on a fair basis, although this is not mandatory. In case of a fair process, the way to adjust the traffic loads on the links between RNC_1 to RNC_j and SGSN_N is similar to the way in which were made the adjustments on the traffic loads between SGSN_1 to SGSN_N and GGSN_i.

In more detail, $\text{Load\_Radio}_{1,N} + \ldots + \text{Load\_Radio}_{j,N} = \text{Load\_SGSN}_N$, where $\text{Load\_SGSN}_N$ represents the current load on SGSN_N. It is aimed to reduce each $\text{Load\_Radio}_{k,N}$ with a value D_k_N, where k is an integer between 1 and j, so that $D\_1\_N + \ldots + D\_j\_N = x\_N\_i$.

Furthermore, if this is done on a fair basis, the most highly loaded links must be adjusted with a higher value, so that:
$D\_1\_N/\text{Load\_Radio}_{1,N} = \ldots = D\_j\_N/\text{Load\_Radio}_{j,N}$.

According to the above mentioned mathematical propriety, this can be written further on as:

$$D\_1\_N/\text{Load\_Radio}_{1,N} =$$
$$\ldots = D\_j\_N/\text{Load\_Radio}_{j,N} = (D\_1\_N + \ldots + D\_j\_N)/$$
$$(\text{Load\_Radio}_{1,N} + \ldots + \text{Load\_Radio}_{j,N}) = x\_N\_i/\text{Load\_SGSN}_N.$$

The target radio access network load reduction values $D\_1\_N, \ldots, D\_j\_N$ can thus be obtained according to the expressions:

$$D\_1\_N = \text{Load\_Radio}_{1,N} * x\_N\_i/\text{Load\_SGSN}_N \quad (8)$$

$$\ldots$$

$$D\_j\_N = \text{Load\_Radio}_{j,N} * x\_N\_i/\text{Load\_SGSN}_N.$$

Such target radio access network load reduction values $D\_1\_N, \ldots, D\_j\_N$ thus depend on the target core network load reduction value x_N_i.

One skilled in the art will understand that those values are only non-limiting examples obtained from a fair basis calculation, but other values could be obtained for all or part of $D\_1\_N, \ldots, D\_j\_N$.

Besides, by replacing in the right hand side of the expression (8) the value x_N_i with its expression from the system (6), we obtain that the traffic load between RNC_j and SGSN_N should be reduced by the value D_j_N:

$$D_{j,N} = \frac{\text{Load\_Radio}_{j,N} * \text{Load\_Core}_{N,i} * (\text{Load\_GGSN}_i - \text{th\_ok}_j)}{\text{Load\_SGSN}_N * (\text{Load\_GGSN}_i - \text{Load\_femto}_i)}. \quad (9)$$

And in the same way, we can obtain the values for $D\_1\_N, D\_2\_N, \ldots, D\_j-1\_N$.

All the values on the right hand side of the expression (9) are known, so $D\_1\_N, \ldots, D\_j\_N$ can be calculated accordingly.

In practice, all or part of the values $D\_1\_N, \ldots, D\_j\_N$ may be calculated according to the expression (8), that is after the value x_N_i has been calculated. But, all or part of the values $D\_1\_N, \ldots, D\_j\_N$ may be calculated according to the expression (9), that is without an explicit reference to the value x_N_i. However even in this latter case, $D\_1\_N, \ldots, D\_j\_N$ depend on x_N_i though implicitly (and thus on the excess value Load_GGSN_i–th_ok_i). Both calculations methods are possible within the framework of an embodiment of the present invention and they are totally equivalent.

The values $x\_1\_i, \ldots, x\_N\_i$ and/or $D\_1\_N, \ldots, D\_j\_N$ may be calculated by one or several devices which may be part of the radiocommunication network. As an example, the values $x\_1\_i, \ldots, x\_N\_i$ may be calculated by GGSN_i or by SGSN_1 to SGSN_N, while the values $D\_1\_N, \ldots, D\_j\_N$ may be calculated by SGSN_N or RNC_1 to RNC_j. Alternatively or in addition, at least part of the calculations may be performed by a separate device. Appropriate entities or units for the device(s) in charge of the calculation may be provided accordingly.

The calculations described above may be performed at predefined times, for instance on a periodic basis, or when determined events occur. As a non-limiting example, the target core network load reduction values and target radio access network load reduction values may be calculated on detection that a current load of GGSN_i (or any other primary node) is above a certain load threshold. This threshold may be the same as the above-mentioned threshold noted th_ok_i. As a variant, it may be different from th_ok_i. In that case, the threshold, noted th_attn_i, may represent a value beyond which GGSN_i is not functioning optimally anymore. Such threshold th_attn_i may be lower than th_ok_i so as to anticipate the times when Load_GGSN_i exceeds th_ok_i. Alternatively, it may be higher than th_ok_i, in order to avoid performing calculations vainly. According to another variant, the same threshold may be used in both cases, which means th_attn_i=th_ok_i. Other events triggering the calculations may be envisaged in addition or in replacement as will appear to one skilled in the art.

Besides, while target radio access network load reduction values have been considered only for RNC-SGSN links, the same type of values may also be calculated for the RNC-BS links in a similar way. This may allow changing traffic distribution not only with an RNC granularity, but as far as BSs are concerned.

After calculated target radio access network load reduction values D_1_N, . . . , D_j_N have been calculated, some actions may be taken for changing traffic distribution accordingly.

Figure 3:
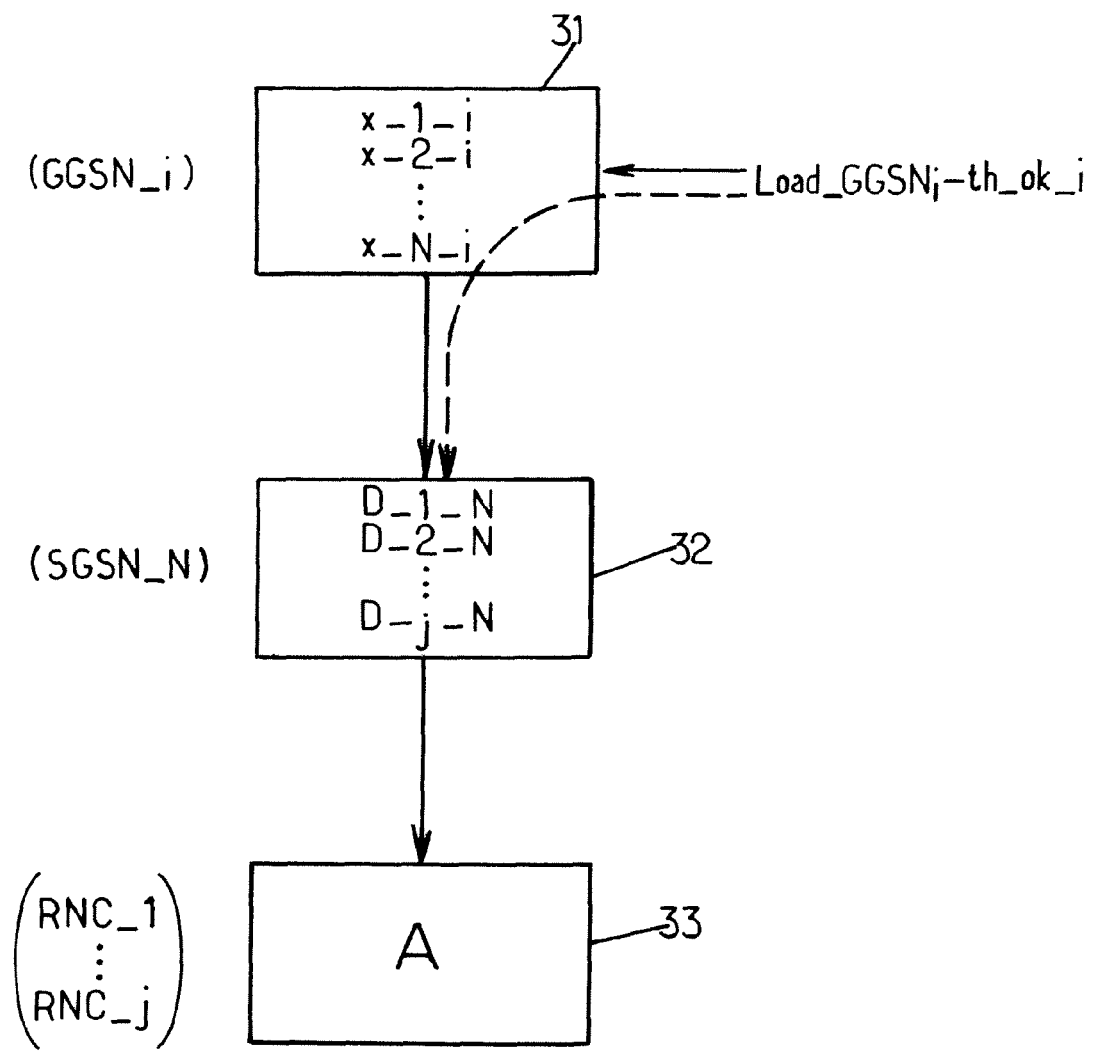
FIG. 3 is a diagram schematically showing steps that may be performed within the framework of an embodiment of the invention.

This is illustrated schematically in FIG. 3, where step 31 corresponds to the calculation of the target core network load reduction values x_1_i, . . . , x_N_i based on the excess value Load_GGSN$_i$–th_ok_i relating to GGSN_i, step 32 corresponds to the calculation of the target radio access network load reduction values D_1_N, . . . , D_j_N based on x_N_i (implicitly or explicitly) in relation to SGSN_N, and step 33 corresponds to actions A to be taken for changing traffic distribution in relation to at least some of RNC_1, . . . , RNC_j.

Various actions may be taken in this regard in an attempt to comply with load reductions taking account of at least some of the calculated target radio access network load reduction values D_1_N, . . . , D_j_N.

When looking at a given RNC, say RNC_j, the actions to be taken should ideally lead to the load on the link between RNC_j and SGSN_N being reduced by D_j_N.

A first possible action would be to hand over some traffic within the radiocommunication network. For example, if GGSN_i is highly loaded giving rise to the calculation of the values D_1_N, . . . , D_j_N, while another GGSN, say GGSN_1, is not, then handovers may be triggered from base stations within the service area of GGSN_i to base stations within the service area of GGSN_1 if possible (in particular if radio coverage allows it). In this way, load reduction for at least some SGSN-RNC links may be reached according to the corresponding target radio access network load reduction values D_1_N, . . . , D_j_N.

Another possible action may be to simply put an end to some ongoing sessions.

In the situation shown in FIG. 1, where the radiocommunication network 3 comprises a femto subnetwork and/or there is also another radiocommunication network 4 as mentioned above, a possible action may be to hand over some traffic over the femto subnetwork and/or the radiocommunication network 4.

Advantageously, the traffic handed over the femto subnetwork and/or the radiocommunication network 4 is selected by taking account of at least one of several possible criteria relating to said traffic.

For example, it may be taken into consideration a current experienced Quality of Service (QoS). Thus, sessions with a below acceptable QoS may be given priority in the selection process. In this way, QoS for the handed over sessions may be improved.

In addition or alternatively, the sessions which have session continuity capability may be given priority. Software running on the user equipment may inform the radiocommunication network operator in a message whether the service (and/or equipment) has session continuity capability. In order for a service to have session continuity capability, it may use a MobileIP technology.

In addition or alternatively, it may be taken into consideration whether an ongoing session relates to a service provided by the operator of the radiocommunication network 3, or is pure Internet based. If the service is provided by the operator of the radiocommunication network 3, then the service is likely to still be working properly when connected to femtocell, but it is unlikely to be accessible when connected to the WiFi radiocommunication network 4 (without IWLAN technology). More generally, the potential need to go through the core network of the radiocommunication network 3 may be taken into account in the process of selecting traffic to be handed over the femto subnetwork and/or the radiocommunication network 4.

The traffic going through an RNC, an SGSN and a GGSN of the radiocommunication network 3 may be handed in priority over the femto subnetwork or the radiocommunication network 4 depending on a current load of that RNC and/or that SGSN and/or that GGSN.

For example, if the SGSN and/or GGSN is not so busy, but the RNC is busy, then it may be better for the operator to tell the services to handover to femtocell first, and if not possible, then handover to WiFi. In this way, if the services are handed over to femtocell, it means that the radiocommunication network is bypassed, but the traffic still goes though the operator's core network, so the user will still be able to use services that belong to the radiocommunication network operator.

In another example, if the RNC is very loaded or if both the SGSN and/or GGSN and the RNC are busy, it may be preferred for the sessions to be handed over to WiFi, in order to totally bypass the operator's radiocommunication network 3.

Other priority strategies may be envisaged as will appear to one skilled in the art.

Accordingly, user equipment involved in the traffic handed over the femto subnetwork or the radiocommunication network 4 may be instructed of whether said traffic is to be handed in priority over the femto subnetwork or the second radiocommunication network. The instruction sent to the user equipment might be one of the following:

"try handover to WiFi first, then femtocell": in this case, a software client running on the user equipment will try to turn on the WiFi interface, and if WiFi is available, then handover to WiFi. If there is not WiFi available, the user equipment checks if femtocell is available. If femtocell is available, then the user equipment will connect to femtocell. If femtocell is not available, then the user equipment remains connected to the RAN 2.

"try handover to femtocell first, then to WiFi": in this case, a software client running on the user equipment will first check if femtocell is available. If it is available, then it will connect to femtocell. If femtocell is not available, it will try turn on the WiFi interface. If there is a WiFi available, then the user equipment tries to handover to WiFi. If there is no WiFi available, then the user equipment remains connected to the RAN 2.

Such instruction may be transmitted to the user equipment(s) concerned from the radio controller handling the session(s) to be handed over or from another entity. The instruction may be transmitted in an appropriate message. This message may be dedicated for that use. Alternatively, it may make use of an existing HANDOVER_FROM_UTRAN_COMMAND or HANDOVER_COMMAND [DCCH] message as defined in 3GPP standards. It may be expressed as a flag in such message.

An entity which may be part of the radiocommunication network 3, such as each RNC itself, may be in charge of selecting a set of sessions according to the criteria mentioned above and/or performing the handover steps. This entity may be the same as or different from the entity in charge of the above mentioned target load reduction values calculations.

Note that other actions for changing traffic distribution may be taken in addition to or in replacement of the ones described above in an attempt to reach at least some of the target radio access network load reduction values for at least some respective links.

After appropriate actions for changing traffic distribution have been taken, load reductions with the values D_1_N, ..., D_j_N may have occurred on all the corresponding links. But in other cases, only some of the links may have their load reduced by the corresponding target reduction value. It may also happen that load reductions of only part of the values D_1_N, ..., D_j_N have occurred on the corresponding links. For example, the link between RNC_j and SGSN_N may be reduced of a value which is less than D_j_N. This may be because not enough traffic controlled by RNC_j could be handed over to another RNC, to the femtocell 8 or to the WHS 9, or any other reason.

After appropriate actions for changing traffic distribution have been taken, possibly after a determined amount of time, the current load Load_GGSN$_i$ of GGSN_i (or any other given primary node) may be measured. If it is in excess compared to a threshold, e.g. th_ok_i, at least some of the steps described so far may be performed again.

A training process for establishing the values for the threshold(s) mentioned above may also be carried out. For example, if the current load Load_GGSN$_i$ of GGSN_i is not significantly better than the previous load value, then th_attn_i may be decreased. In this way, next time actions will be taken from an earlier stage and this will increase the probability for the new load value to be lower than the previous value.

Many other variants can be envisaged within the scope of the appended claims.

I claim:

1. A method of managing traffic load in a first radiocommunication network comprising a core network including primary and secondary nodes and a radio access network including radio controllers, each primary node connecting at least one secondary node and each secondary node connecting at least one radio controller via respective links, the method comprising the following steps in relation to a given primary node:

calculating, with at least one entity in said first radio communication network, respective target core network load reduction values for the links connecting the given primary node and secondary nodes, depending on a value at which a current load of the given primary node exceeds a first primary node load threshold;

calculating, with the at least one entity in said first radio communication network, respective target radio access network load reduction values for the links connecting said secondary nodes, which are connected to the given primary node, and said radio controllers, depending on calculated target core network load reduction values; and taking actions, with the at least one entity in said first radio communication network, to change traffic distribution in the radiocommunication network by taking account of at least some of the calculated target radio access network load reduction values.

2. The method as claimed in claim 1, wherein the target core network load reduction values and/or the target radio access network load reduction values are calculated on a fair basis, by taking account of current load values of the links connecting the given primary node and secondary nodes and/ or the links connecting said secondary nodes, which are connected to the given primary node, and said radio controllers.

3. The method as claimed in claim 1, wherein the first radiocommunication network further comprises a femto subnetwork including a femto node connected to the given primary node, and wherein the calculated respective target core network load reduction values for the links connecting the given primary node and secondary nodes further depend on a difference between the current load of the given primary node and a current load of the link between the femto node and the given primary node.

4. The method as claimed in claim 1, wherein the target radio access network load reduction value $D_{j,N}$ for the link connecting the secondary node N connected to the given primary node i and the radio controller j is calculated as:

$$D_{j,N} = \frac{\text{Load\_Radio}_{j,N} * \text{Load\_Core}_{N,i} * (\text{Load\_GGSN}_i - \text{th\_ok}_j)}{\text{Load\_SGSN}_N * (\text{Load\_GGSN}_i - \text{Load\_femto}_i)};$$

where N, i and j represent integers, Load_Radio$_{j,N}$ is a variable representing the load of the link between the radio controller j and the secondary node N; Load_Core$_{N,i}$ is a variable representing the load of the link between the secondary node N and the given primary node i, the given primary node I; Load_GGSN$_i$ is a variable representing the load of the given primary node I; Load_SGSN$_N$ is a variable representing the load of the secondary node N; and Load_femto$_i$ is a variable representing the load of the link between a femto node, if any, and the given primary node i, and th_ok$_j$ represents said primary node load threshold for the given primary node i.

5. The method as claimed claim 1, wherein the load of any of said nodes, radio controllers and links is a function of at least one of a corresponding: used bandwidth, number of running sessions, processing effort, type of service or quality of service.

6. The method as claimed in claim 1, wherein the target core network load reduction values and target radio access network load reduction values are calculated on detection that a current load of the given primary node is above a second primary node load threshold.

7. The method as claimed in claim 6, wherein a new current load of the given primary node is measured after said actions for changing traffic distribution have been taken, and if the measured current load of the given primary node is still in excess compared to the first primary node load threshold, the second primary node load threshold is decreased.

8. The method as claimed in claim 1, wherein the actions taken for changing traffic distribution include handing over some traffic within the first radiocommunication network so as to reach at least some of the target radio access network load reduction values for at least some respective links connecting said secondary nodes, which are connected to the given primary node and said radio controllers.

9. The method as claimed in claim 1, wherein the first radiocommunication network further comprises a femto subnetwork including a femto node connected to the given primary node, and there is a second radiocommunication network unconnected to the core network of the first radiocommunication network, the actions taken for changing traffic distribution including handing some traffic over to the femto subnetwork and/or the second radiocommunication network so as to reach at least some of the target radio access network load reduction values for at least some respective links connecting said secondary nodes connected to the given primary node and radio controllers.

10. The method as claimed in claim 9, wherein the traffic handed over to the femto subnetwork and/or the second radiocommunication network is selected by taking account of at least one of the following criteria relating to said traffic: quality of service, session continuity capability, or need to go through the core network of the first radiocommunication network.

11. The method as claimed in claim 9, wherein the traffic going through a radio controller, a secondary node and a primary node of the first radiocommunication network is handed over in priority over the femto subnetwork or the second radiocommunication network depending on a current load of said radio controller and/or on a current load of said secondary node and/or on a current load of said primary node.

12. The method as claimed in claim 11, wherein a user equipment involved in the traffic handed over to the femto subnetwork or the second radiocommunication network is instructed of whether said traffic is to be handed over in priority over the femto subnetwork or the second radiocommunication network.

13. The method as claimed in claim 12, wherein the instruction is transmitted by the radio controller through which said traffic goes, in a HANDOVER_FROM_UTRAN_COMMAND or HANDOVER_COMMAND [DCCH] message.

14. A radiocommunication network comprising:
a core network including primary and secondary nodes and a radio access network including radio controllers, each primary node connecting at least one secondary node and each secondary node connecting at least one radio controller via respective links, the radiocommunication network being arranged and configured to manage traffic load in the radiocommunication network and comprising in relation to a given primary node:
a first calculation entity configured to calculate respective target core network load reduction values for the links connecting the given primary node and secondary nodes, depending on a value at which a current load of the given primary node exceeds a first primary node load threshold; a second calculation entity configured to calculate respective target radio access network load reduction values for the links connecting said secondary nodes, which are connected to the given primary node, and said radio controllers, depending on calculated target core network load reduction values; and an entity configured to take actions to change traffic distribution by taking account of at least some of the calculated target radio access network load reduction values.

* * * * *